(12) United States Patent
McCullough

(10) Patent No.: US 8,197,730 B2
(45) Date of Patent: *Jun. 12, 2012

(54) MOLDING METHOD FOR FORMING IN-MOLD METALLIZED POLYMER COMPONENTS

(75) Inventor: Kevin A. McCullough, North Kingstown, RI (US)

(73) Assignee: Cool Options, Inc., North Kingstown, RI (US)

( * ) Notice: Subject to any disclaimer, the term of this patent is extended or adjusted under 35 U.S.C. 154(b) by 47 days.

This patent is subject to a terminal disclaimer.

(21) Appl. No.: 11/782,061

(22) Filed: Jul. 24, 2007

(65) Prior Publication Data

US 2007/0264513 A1    Nov. 15, 2007

Related U.S. Application Data

(62) Division of application No. 11/279,442, filed on Apr. 12, 2006, now Pat. No. 7,413,691.

(60) Provisional application No. 60/670,991, filed on Apr. 13, 2005.

(51) Int. Cl.
*B29C 47/00* (2006.01)

(52) U.S. Cl. ........ 264/108; 264/7; 264/241; 264/328.12

(58) Field of Classification Search .................. None
See application file for complete search history.

(56) References Cited

U.S. PATENT DOCUMENTS

| | | | | |
|---|---|---|---|---|
| 4,426,479 A * | 1/1984 | Deguchi et al. | ........... | 524/430 |
| 4,533,685 A * | 8/1985 | Hudgin et al. | ........... | 523/457 |
| 4,610,808 A * | 9/1986 | Kleiner | ........... | 252/512 |
| 4,795,660 A   | 1/1989 | Cooray et al. | | |
| 5,280,052 A * | 1/1994 | Questel et al. | ........... | 523/219 |
| 5,464,585 A   | 11/1995 | Fitzgibbon | | |
| 6,322,588 B1  | 11/2001 | Ogle et al. | | |
| 6,478,997 B2  | 11/2002 | McCullough | | |
| 6,573,322 B1* | 6/2003 | Sakakibara et al. | ........... | 524/434 |
| 6,715,196 B2* | 4/2004 | Reising et al. | ........... | 29/458 |
| 7,413,691 B2* | 8/2008 | McCullough | ........... | 264/108 |
| 2006/0234068 A1 | 10/2006 | McCullough | | |

FOREIGN PATENT DOCUMENTS

DE    19962408 A1 *  6/2001
JP    11273458 A  * 10/1999

* cited by examiner

*Primary Examiner* — Monique Jackson
(74) *Attorney, Agent, or Firm* — Barlow, Josephs & Holmes, Ltd.

(57) ABSTRACT

A method is provided for forming a feedstock material for use in net shape molded component that includes an integral metallized coating or layer on the exterior surface thereof. The feedstock includes a carefully matched mixture of polymer resin and a metallic alloy that is suitable for use in a molding method that includes melting and injecting the material into a mold cavity under pressure. Due to the differential in material viscosities, the metal tends to migrate to the outer surface of the molded part when placed under pressure, ultimately creating a net shape molded part having a polymer core with a metallic layer at the exterior surfaces thereof.

5 Claims, 2 Drawing Sheets

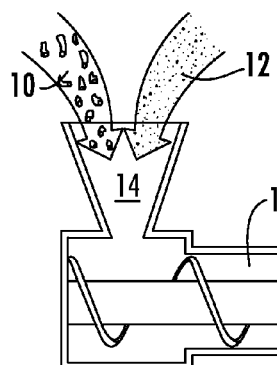
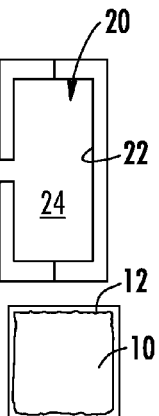
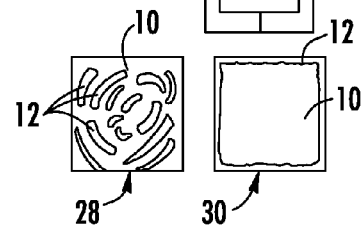
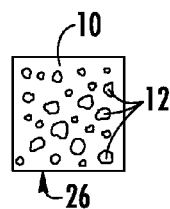
FIG. 1
FIG. 2
FIG. 3
FIG. 4
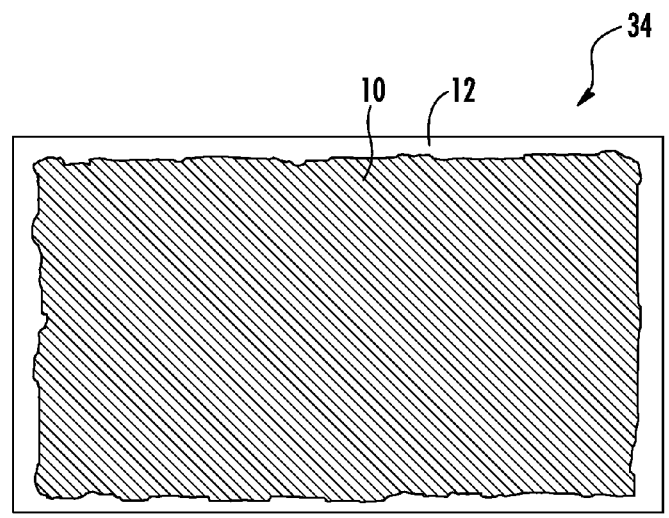
FIG. 5

MOLDING METHOD FOR FORMING IN-MOLD METALLIZED POLYMER COMPONENTS

CROSS-REFERENCE TO RELATED APPLICATIONS

This application is related to and claims priority from earlier filed U.S. patent application Ser. No. 11/279,442, filed on Apr. 12, 2006, which claims priority from U.S. Provisional Patent Application No. 60/670,991, filed Apr. 13, 2005, the contents both of which are incorporated herein by reference.

BACKGROUND OF THE INVENTION

The present invention relates generally to polymer components having a metallic coating on an exterior surface thereof. More specifically, the present invention relates to molded polymer components with a metallic layer on their exterior surface wherein the metallic layer is entirely formed within the mold cavity before the part is removed from the mold. Further, the present invention is directed to a method of forming a molded polymer part to include a metallic layer about its exterior surface while the part remains in the mold.

In the component manufacturing industry, it is highly desirable to form components using the fewest number of steps, thereby increasing the speed and efficiency while reducing the cost at which such parts can be produced. Given these goals, a popular manufacturing process for the formation of components is net shape molding. In the net shape molding process, a molten raw material is placed into a mold cavity such that when the component is removed from the mold it is in its finished form and no further processing is required to complete it. Due to the simplicity of the process, net shape molding is used in conjunction with a wide variety of base materials including polymer resins and various metals.

While the net shape molding process works well for a broad range manufactured components, the difficulty with using a net shape molding process, particularly with polymer materials, is that often other steps are required in order to impart various other desirable properties to the part after the molding step is completed. For example, parts that are utilized in electronic devices often must provide additional functionality such as transferring heat within the device, shielding against the effects of electromagnetic interference (EMI), reflecting radiant energy away from sensitive components within the device and/or reflecting light output such as that from a lamp or a light emitting diode (LED). Accordingly, in the prior art, when a reflective surface was desired, the part often was formed using another manufacturing method such as spinning or machining of metal components or by providing a metallized coating onto the desired surface of a polymer based part thereby requiring additional processing steps beyond the net shape molding process. In either case, the cost of manufacturing the part is dramatically increased.

The preferred method of metallizing a polymer component after it has been net shape molded has several drawbacks. Principally, as was stated above, metallizing dramatically increases the cost and time required to manufacture the part. Generally, metallizing requires that the part, once removed from the mold, be prepared using a chemical bath, subsequently plated using vapor deposition or vacu-plating and then finally clear coated to protect the thin layer of metal that was deposited onto the part. These additional steps introduce a great deal of additional handling of the part before it attains its finished state and result in nearly doubling the cost associated with manufacturing the part. Further, even though the cost of the part is increased dramatically, the coating is highly susceptible to wear, peeling, flaking and scratching, all of which lead to premature failure of the component.

Alternately, in the prior art when a part required enhanced thermally conductive properties, the base polymer resin was typically loaded with highly thermally conductive fillers to enhance the thermal conductivity of the finished part. Such fillers typically include carbon black, carbon fibers, ceramic powders and/or metal flakes. While the thermal conductivity of the polymer is improved by the addition of such fillers, the cost of these conductive fillers is typically quite high and the filler loadings that are typically required in order to attain the desired thermal and electrical conductivity properties also resulted in a dramatic impact on the flexibility and strength of the base polymer resin. Further, due to the difference in density between the filler materials and the polymer resin component, the molded part typically includes a resin rich region at its outer surfaces with a concentration of the filler materials towards the center of the component. This is particularly problematic when trying to increase the electrical conductivity of the part because electrical flux tends to travel over the surfaces of objects, precisely in the region of the part that has the lowest concentration of filler material. Accordingly, it is difficult to produce a part that has a relatively high electrical conductivity using net shape molded filler polymers.

Therefore, there is a need for a component that is formed during the molding process to include a metallized surface. There is a further need for a component that is formed during the molding process to include an integrally formed metallized surface that is highly durable and resistant to wear. There is still a further need or a process of in mold metallization of polymer components that preserves all of the desirable aspects of the net shape molding process and eliminates the additional steps that are traditionally associated with metallizing. Finally, there is a need for a compounded material that is suitable as feed stock for use in connection with the net shape molding of an in mold metallized polymer component.

BRIEF SUMMARY OF THE INVENTION

In this regard, the present invention provides for a novel method of forming a net shape molded component that includes an integrally formed metallized coating or layer on the exterior surface thereof. In forming the component, the molten materials, including at least a base polymer and a molten metal are injected into a mold cavity under pressure, as will be more fully described below, in a manner that results in the metal migrating to the outer surface of the part and toward the inner walls of the mold cavity. The result of this process is that when the part is cooled and removed from the molding cavity, a net shape molded part is formed that has polymer core with a metallic layer at the exterior surfaces thereof. Further, the present invention provides for the compounding of a feedstock material composition that is suitable for use in conjunction with the method described above.

Generally, a metal alloy and a polymer resin are selected so that they are carefully matched with respect to their relative melting points and in order to insure that the polymer and metal are not miscible. It is particularly important within the scope of the present invention that the melting point of the metallic alloy be tailored to fall towards the upper end of the desired molding range of the base polymer resin and above the temperature at which the resin is typically compounded. Further, it is also important that the melting point of the alloy fall at a temperature that will not be reached within the extrusion barrel of the molding machine until the polymer composite (including the metallic alloy) passes the check ring on the extrusion barrel. Since the metallic alloy has very low viscosity in its molten state, maintaining the metallic alloy in a solid state until it passes the check ring prevents the possibility that molten metal flow rearwardly through the barrel past the extrusion screw.

After the flow of material passes the check ring on the extruder barrel, the flow of material reaches a temperature wherein both the polymer and metallic alloy are in a molten state and are subsequently injected into the mold cavity. As the pressure within the molding cavity increases, the lower viscosity material tends to migrate to the exterior surfaces of the mold cavity where the differential pressure is greatest and the higher viscosity material remains in the central region of the mold cavity. Accordingly, in the context of the present invention, since the molten metal has the lower viscosity, the molten metal is driven out of the mixture and to the outer surfaces of the mold cavity while the polymer, having a higher viscosity remains at the core of the mold cavity. Once the part is allowed to cool, the resultant part is a net shape molded part having a polymer core with a metallic coating or layer disposed on or at the exterior surfaces thereof.

The formation of a feedstock material suitable for use in the method of the present invention is also provided. In this manner, a polymer composition is compounded that includes powdered metallic alloy dispersed uniformly throughout a base polymer resin. In this regard it is important that the metallic alloy remain in solid state at the compounding temperature of the polymer resin so that the alloy does not liquefy during the compounding process and prematurely separate from the polymer resin material.

Accordingly, it is a goal of the present invention to provide a method of forming a net shape molded component part that includes an integrally formed metallized surface. It is a further goal of the present invention to provide a method of forming a component that includes an integrally formed metallized surface that is highly durable and resistant to wear through the use of a traditional net shape molding apparatus. It is yet a further goal of the present invention to provide a process of in mold metallization of polymer components that preserves all of the desirable aspects of the net shape molding process and eliminates the additional steps that are traditionally associated with metallizing. Finally, it is a goal of the present invention to provide a compounded material that is suitable as feed stock for use in connection with the net shape molding of an in mold metallized polymer component.

These together with other objects of the invention, along with various features of novelty, which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention:

FIG. 1 is a schematic cross-sectional view of a molding machine for implementing the method of the present invention;

FIG. 2 is a cross-sectional view of granular metal suspended in a polymer resin as it passes along the molding machine of FIG. 1;

FIG. 3 is a cross-sectional view of molten metal suspended in a polymer resin as it passes through the check ring of the molding machine of FIG. 1;

FIG. 4 is a cross-sectional view of molten metal and polymer resin after pressure is applied;

FIG. 5 is a representational cross sectional view of a net shape molded composite made in accordance with the method of the present invention;

DETAILED DESCRIPTION OF THE INVENTION

Figure 6:
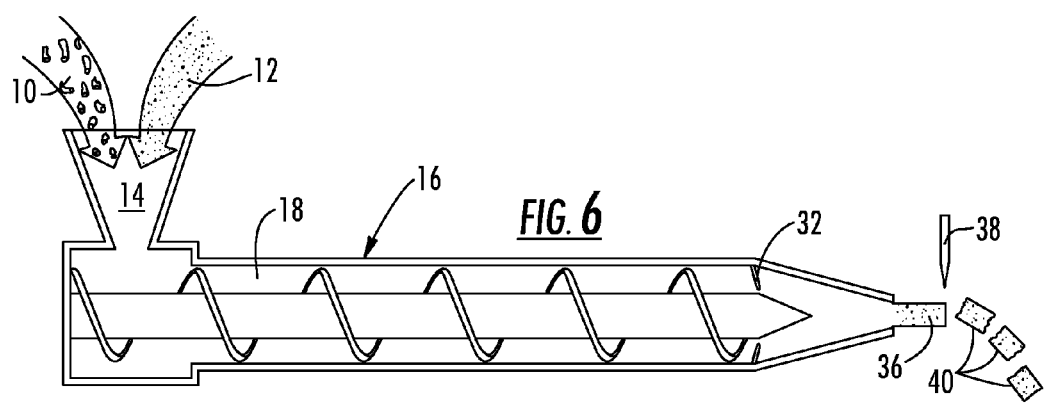
FIG. 6 is a schematic cross-sectional view of a molding machine implementing an alternate method of the present invention.

Now referring to the drawings, the implementation of the method of the present invention is shown and generally illustrated in FIGS. 1-4. As was stated above, the method of the present invention is principally directed toward in mold metallization of molded polymer composite components. More particularly, the method of the present invention is directed to the formation of a net shape molded polymer composite component having a metallic layer about an exterior surface thereof. In the context of the present invention, the net shape molding process is a common and well-known process whereby a component part is formed on the interior of a mold cavity wherein the part is in its completed form upon removal from the mold cavity.

Referring generally to FIGS. 1-4, in forming the net shaped composite component, the method of the present invention generally includes the provision of a polymer resin 10 and a granular metal 12, both of which are dry blended or separately deposited into the hopper 14 of an injection molding machine 16 for mixing as they pass through the molding process. The polymer resin 10 and granular metal 12 are then heated until the polymer resin 10 becomes molten. The polymer resin 10 and granular metal 12 are then further blended in the barrel 18 of the injection-molding machine 16 as they are drawn down the barrel 18. The mixture of polymer resin 10 and granular metal 12 are initially heated to a temperature that is above the lower melting point of the polymer resin 10 but below the melting point of the metal 12 for reasons that will be fully disclosed in detail below. Once the blended composition has advanced a sufficient distance down the barrel 18 of the injection-molding machine 16, the composite is further heated to a temperature that is above the melting point of the granular metal. Finally, the fully molten composition is injected under pressure into a mold cavity 20 wherein the pressure causes the metal 12 within the composition to separate from the polymer 10 in a manner that causes the metal 12 to migrate toward the molding cavity walls 22 and the polymer to migrate toward the interior 24 of said cavity 20. After the molded component part has cooled, the result is a component part that includes a metallic layer that surrounds a polymer core.

In FIGS. 2-4, the various phases that the composition advances through during the process of the present invention are shown. As can be seen in FIG. 2, reference 26 depicts the granular metal 12 uniformly dispersed throughout the molten polymer 10. It is important to note that the granular metal 12 remains in its solid state at this point in the process as it passes along the bore 18 of the injection molding machine 16. in FIG. 3, reference 28 depicts the composition after is has passed through the check ring 32 located at the output end of the injection molding machine 16. The check ring 32 acts as a one-way valve that prevents any rearward flow of the composition. At this point in the process, it can be seen that the metal 12 has become molten as well, but the metal material 12 is still suspended within the polymer resin 10. Turning now to FIG. 4, in reference 30, it can be seen that as pressure is applied to the molten composite material, physics dictates that the lower viscosity material will migrate to the locations within the mold cavity 20 that have a higher differential pressure, in this case, the lower viscosity molten metal 12 migrates to the cavity walls 22 of the mold 20 while the higher viscosity polymer 10 migrates toward the center core 24 of the mold cavity 20. As a result, the metal 12 that is suspended within the polymer 10 is fully driven out towards the cavity walls 22 while the polymer 10 remains at the core of the mold 20. Upon cooling, therefore, the composite component includes a polymer core 10 and a metallic layer 12 disposed about the exterior surfaces of the polymer core 10 material.

In implementing the process of the present invention, it is important that the base polymer 10 and granular metallic material 12 are well suited for combination in the in mold metallization process. One important criterion in selection of the polymer resin 10 and granular metal 12 is that the polymer 10 and metal 12 have no affinity for one another thereby preventing them from fully mixing or forming an alloy. Should the metal 12 and polymer 10 be miscible, they would create a mixture that was not separable ultimately resulting an alloy that would prevent the migration of the metal 12 to the outer surface of the component part during the molding process. Additionally, the metal 12 and polymer 10 must be selected such that their respective melting points are balanced. More specifically, polymer resins have a usable range over which they become molten and remain usable. This usable molten range is a key factor in the process of the present invention. Often, polymers are compounded using a melting point at the lower end of their usable molten range and are molded using a melting point at the higher end of their usable molten range. With this limitation in mind, the metal 12 must be selected to have a melting point that falls at the correct point within the usable molten range of the polymer 10 in order for the method of the present invention to succeed. If the melting point of the metal 12 is much higher than the melting point of the polymer 10, the polymer 10 would likely burn before the melting point of the metal 12 is reached. Conversely, if the melting point of the metal 12 is much lower that that of the polymer 10, separation of the materials would result too early in the molding process resulting in a globular molding composition. Accordingly, it is preferred that a metal 12 be selected that has a melting point which is above the typical compounding temperature range of the base polymer 10 yet within the typical molding range of the polymer resin 10 and below the upper limit of the usable molten range of the polymer 10. Finally, the viscosity of the molten metal 12 must be lower than the viscosity of the molten polymer 10 at the operating temperature of the molding process.

In the context of the present invention, a variety of polymer resins 10 are suitable for use and all would fall within the scope of the present disclosure. The most important criterion for selecting a polymer resin 10 material is the ability to select a resin that has a usable molten range that closely corresponds with the melting point of the selected granular metal 12 as described above. Suitable polymer resins 10 may include a wide range of thermoplastic and/or theromset resins as well as alloys thereof. More preferably, polymer resins 10 that are particularly suited for use in connection with the present invention include polyphenylene sulfide (PPS), co-polymers of acrylonitrile, butadiene, styrene (ABS) and polycarbonate.

In terms of granular metal 12 selection, it can be seen that the metal 12 must have a relatively low melting point that falls within the usable molten range of the base polymer resin 10. It is particularly preferable that such a metal 12 be a eutectic alloy wherein the melting point of the alloy is lower that the melting point of either of the constituent metal components. Often such low melt metals 12 are alloys formed using Tin, Zinc and/or Antimony. Accordingly, metals 12 that are particularly suited for use in connection with the present invention include Tin-Zinc, Tin-Antimony and Zinc-Antimony alloys, although is should be appreciated to one skilled in the art that any metallic material that meets the requirement of having a melting point which is relatively closely matched to the usable molten range of the polymer 10 would be suitable.

Example 1

An ABS polymer resin is selected having a usable molten range of between about 440° F. and 470° F. wherein the ABS is typically compounded between the range of 440° F. and 455° F. and molded between about 455° F. and 470° F. The metallic alloy is formed using approximately 95% Tin and approximately 5% Antimony having a melting point of 463° F. In this example, the metallic alloy is mixed into the polymer resin using the compounding temperature range. Once the composition passes the check ring in the injection molding barrel, the temperature is elevated to the preferred molding temperature for the polymer of 470° F. causing the alloy to melt as the composition is injected into the mold cavity under pressure.

Example 2

A PPS polymer resin is selected having a usable molten range of between about 560° F. and 610° F. wherein the PPS is typically compounded between the range of 560° F. and 565° F. and molded between about 565° F. and 610° F. The metallic alloy is formed using approximately 60% Tin and approximately 40% Zinc having a melting point of 585° F. In this example, the metallic alloy is mixed into the polymer resin using the compounding temperature range. Once the composition passes the check ring in the injection molding barrel, the temperature is elevated to the preferred molding temperature for the polymer of about 590° F. causing the alloy to melt as the composition is injected into the mold cavity under pressure.

Clearly, while certain polymers 10 and metal alloys 12 have been referred to by name, the present invention is applicable to any process utilizing the general teachings described herein as they would function equally well with a base polymer 10 and metal 12 selected utilizing the selection criteria provided within the disclosure. Further, various different material combinations as well as end uses for the part manufactured using the disclosure provided still fall within the spirit of the present invention.

Turning now to FIG. 5, a representational cross sectional view of a component 34 formed in accordance with the teachings of the present invention is shown. The resultant component 34 can be seen to include a polymer core 10 having a metallic outer surface 12 that is relatively thick as compared to metallizing processes in the prior art. Due to the thickness of the metallic surface 12 it is of particular note that the surface is highly resistant to scratching. When tested utilizing the known prior art testing processes for determining the durability of traditional metallized surfaces, the components 34 manufactured using the teachings of the present invention exhibited no evidence of peeling, flaking or scratching. Of particular note is the fact that the metallic coating 12 on the component exhibited durability and wear characteristics associated with those of the base metal itself. These unique durability and strength characteristics are possible because the outer metallic layer 12 is formed by migrating the material outward and retaining a linked bond with the plastic core 10 material. This is in contrast to prior art methods where the metallic material is simply sprayed on without the highly advantageous linked bond of the method of the present invention. Further, while outer surface 12 of the component part 34 exhibits the characteristics of the base metal, the strength properties of the component part 34 remain in line with the strength characteristics of the polymer resin 10 selected. This is an improvement as compared to the use of filler polymers wherein the polymers typically lost a great deal of their flexibility and became quite brittle.

It should also be noted that should a highly thermally conductive component 34 be needed, the base polymer 10 may be filled with any number of thermally conductive fillers such as boron nitride, alumina, metal flakes such as aluminum or copper, carbon fillers as is well known in the prior art to greatly enhance the thermal conductivity of the base polymer 10 and in turn the overall thermal conductivity of the component part 34.

There are other variables that must be considered, as they may affect the process and the resultant component of the present invention, but are not required limitations within the process itself. Such variables include the manner in which the mold cavity 20 is filled, the pressure used to fill the cavity 20 and the temperature of the mold 20 itself. If the mold 20 is too cold as it is filled, the material molding composition may begin to set before the pressure in the cavity is increased to a point that the metal 12 migrates to the exterior surface 22. To prevent this from happening in larger mold tools, the tool may need to be preheated. Higher tool temperatures accordingly would prevent the metal 12 from setting too quickly. Further, utilizing a high compression screw impacts the process of the present invention. In this case, the high pressure within the screw results in early separation of the composition within the barrel 18 of the injection-molding machine 16 itself. Therefore, lower speeds and pressures within the compounder are desirable to maintain the uniformity of the composition until it is injected into the mold cavity 20. The thickness of the metallic layer 12 that is deposited on the outer surface of the part 34 is primarily controlled by controlling the relative volumes of polymer 10 and metal 12 that is utilized in the molding composition although, partial control over the thickness may also be achieved by variations in mold cavity pressure.

Figure 7:
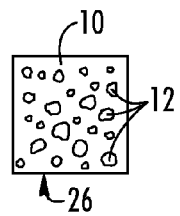
FIG. 7 is a cross-sectional view of granular metal suspended in a polymer resin as it passes along the molding machine of FIG. 6.

Turning now to FIGS. 6 and 7, an alternate method for implementing the teachings of the present invention is illustrated. In this case, a method of forming a polymer composite feedstock for use in net shape molding a component 34 having a metallic layer 12 about an exterior surface thereof is provided. This method as described in the teachings above include the provision of a polymer resin 10 and a granular metal 12, both of which are dry blended or separately deposited into the hopper 14 of an injection molding machine 16 for mixing as they pass through the molding process. The polymer resin 10 and granular metal 12 are then heated until the polymer resin 10 becomes molten. The polymer resin 10 and granular metal 12 are then further blended in the barrel 18 of the injection-molding machine 16 as they are drawn down the barrel 18. The mixture of polymer resin 10 and granular metal 12 are initially heated to a temperature that is above the lower melting point of the polymer 10 but below the melting point of the metal 12.

As can be seen in FIG. 7, reference 26 illustrates what a close up view of the composition may appear like wherein the granular metal 12 remaining in a solid state is uniformly dispersed throughout the polymer resin 10. At this point in the process the composite is extruded rather that further heated for molding. The extrudate 36 provides a polymer composition having a granular metal 12 blended therein that is suitable for use as injection molding feedstock in accordance with the present invention. As the extrudate 36 cools, it may be then pelletized using a cutting device 38 to form pellets 40 as are typically provided to manufacturers for use as injection molding feedstock.

The pellets 40 in turn are then subsequently fed into a hopper 14 of an injection molding machine 16 and molded in the process as described above wherein the pellets 40 are advanced along an injection molding bore 18 to first melt the polymer resin 10 and then, once the composition has passed the check ring 32 in the molding barrel 18, heated to melt the granular metal 12. In all other respects the process operates as described above.

Accordingly, the method of the present invention can be seen to create a net shape molded part that includes a metallic coating 12 or layer on the outer surfaces thereof that could only be obtained in the prior art by the expensive and lengthy metallization process. The in mold metallized part of the present invention exhibits greatly improved durability as compared to parts formed using prior art methods while also providing a dramatic decrease in time and cost associated with forming such parts. It is anticipated that parts formed using the present invention would be suitable for use in any variety of electronics application wherein heat transfer or EMF shielding are required as well as in any other application wherein a metallized polymer component would be useful for either functional or decorative purposes. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A method of forming a polymer composite feedstock for use in net shape molding a component having a metallic layer about an exterior surface thereof, the method comprising the steps of:

providing a polymer resin, said polymer resin having a usable molten state that exists between a first temperature and a second temperature higher than said first temperature;

providing a single granular metal alloy having a melting temperature that is within the range of said usable molten state of said polymer;

heating said polymer resin to a temperature that is greater than said first temperature and less than said melting temperature of said granular metal, thereby causing said polymer resin to become molten;

uniformly dispersing said granular metal throughout said molten polymer resin to form a composition;

extruding said composition to form injection molding feedstock, wherein a processing temperature of said feedstock for subsequent molding operations is less than said second temperature but greater than the melting temperature of said granular metal;

placing said extruded composition into an injection molding assembly;

heating said composition to a temperature that is greater than said melting temperature of said granular metal;

injecting said composition under pressure into a mold cavity having cavity walls, wherein said pressure causes said metal to separate from said polymer, said metal migrating toward said cavity walls and said polymer migrating toward the interior of said cavity;

cooling said composition to form a component having a metallic layer entirely surrounding an exterior surface of a polymer core.

2. The method of claim 1, wherein said granular metal is an alloy of metals selected from the group consisting of zinc, tin and antimony.

3. The method of claim 2, wherein said polymer resin is polyphenylene sulfide (PPS) and said granular metal is an alloy including approximately 60% by weight tin and approximately 40% by weight zinc.

4. The method of claim 2, wherein said polymer resin selected from the group consisting of: acrylonitrile butadiene styrene (ABS) and polyphenylene sulfide (PPS).

5. The method of claim 1, wherein said polymer resin is acrylonitrile butadiene styrene (ABS) and said granular metal is an alloy including approximately 95% by weight tin and approximately 5% by weight antimony.

* * * * *